No. 796,657. PATENTED AUG. 8, 1905.
E. H. JOHNSON.
BRAKE APPARATUS FOR VEHICLES.
APPLICATION FILED DEC. 1, 1903.
2 SHEETS—SHEET 2.
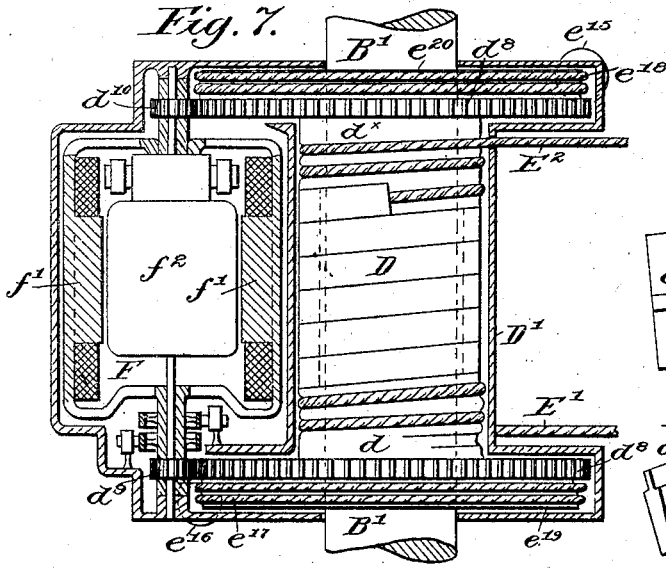
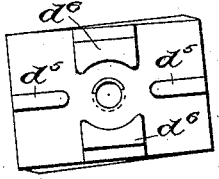
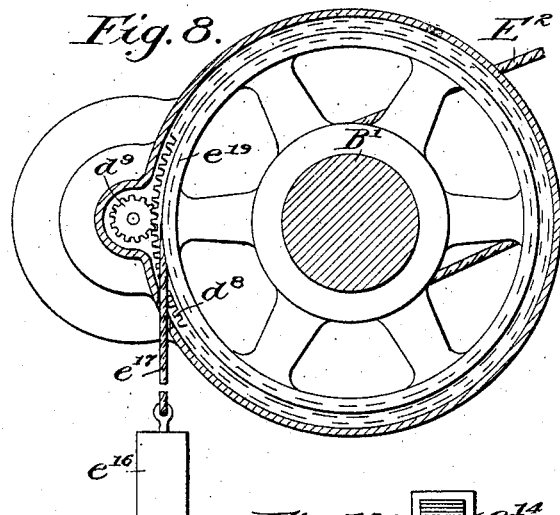
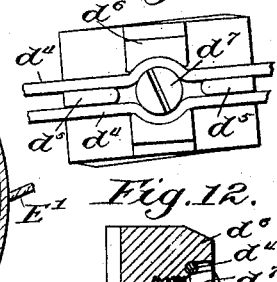
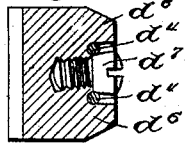
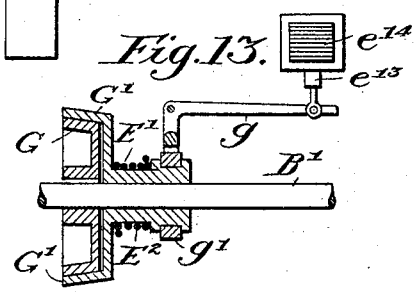
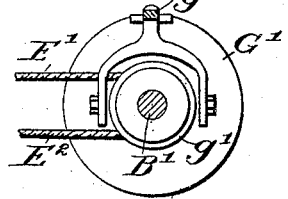
Witnesses:
M. F. Keating
H. J. Schutte
Inventor:
Edward Hibberd Johnson
By his Attorney;
Charles J. Kintner

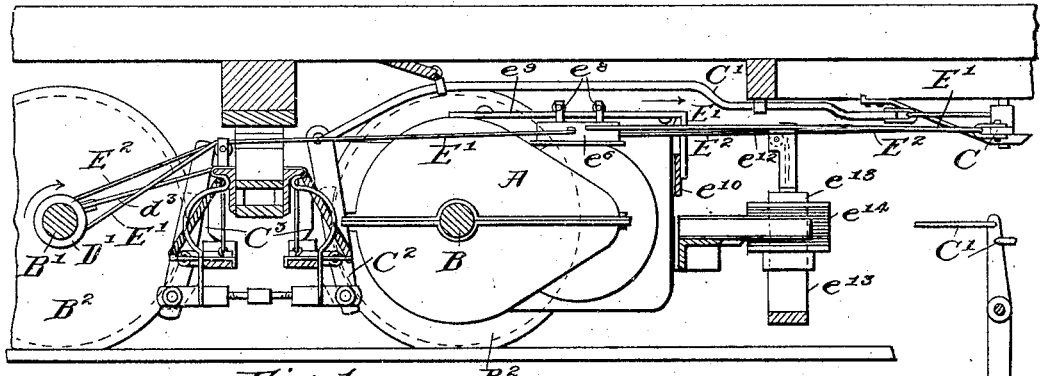

UNITED STATES PATENT OFFICE.

EDWARD HIBBERD JOHNSON, OF LONDON, ENGLAND, ASSIGNOR OF ONE-HALF TO JOHAN GUSTAF VIKTOR LANG, OF LONDON, ENGLAND.

BRAKE APPARATUS FOR VEHICLES.

No. 796,657.  Specification of Letters Patent.  Patented Aug. 8, 1905.

Application filed December 1, 1903. Serial No. 183,347.

*To all whom it may concern:*

Be it known that I, EDWARD HIBBERD JOHNSON, electrician, a citizen of the United States of America, residing at 16$^A$ Soho Square, London, England, have invented certain new and useful Improvements Relating to Brake Apparatus for Vehicles, of which the following is a specification.

This invention relates to brake apparatus for tram-cars and other vehicles, and has for its chief object to utilize the kinetic energy of the vehicle to effect the application of the mechanical brakes to the vehicle-wheels or to the track upon which they run by the expenditure of a small amount of initial energy.

According to my invention I employ in conjunction with the brake lever or levers used for actuating the said mechanical brakes a friction device which by the exertion of the aforesaid small amount of initial energy will be caused to coöperate with a rotary axle driven by the vehicle and to then actuate the aforesaid brakes by energy that it derives from the moving car through the agency of the said rotary axle. The said friction device may be made in the form of a resilient spiral band surrounding the said rotary axle, the ends of the spiral band being connected by wire ropes or other flexible connections to the brake lever or levers and to the contrivance by or through which the said initial energy is exerted upon the spiral band. The said band is advantageously made in sections bound together by convolutions of steel or other resilient wires or members, as will be hereinafter more fully described.

In the application of my brake apparatus to electrically-propelled tram-cars working on what is known as the "regenerative system"—*i. e.*, a system in which the motors are alternatively employed as such to propel the car or as electric generators to retard it, in which latter capacity they return electrical energy to the source of electric supply—I so construct and arrange the aforesaid contrivance by which the initial energy is exerted on the spiral band or other friction device that the latter may come into operation automatically in the event of the failure of the regenerative system or may be brought into operation manually or otherwise when the limit of the regenerative braking function is reached or when a case of emergency arises, and the said contrivance may be furthermore so arranged that the mechanical brakes can be brought into operation by an ordinary hand brake-lever independently of the said contrivance and without disturbing its above-stated functions.

In order that my said invention may be clearly understood and readily carried into effect, I will now describe the same more fully with reference to the accompanying drawings, in which—

Figure 1 is a sectional side elevation of a portion of the underframe of an electrically-propelled tram-car with my brake apparatus applied thereto. Fig. 2 is a plan of my brake apparatus. Fig. 3 is a longitudinal section, and Fig. 4 a transverse section, of the axle and friction device shown on a larger scale. Fig. 5 is a plan, and Fig. 6 a longitudinal section, taken approximately on the line 1 1, showing one form of the aforesaid contrivance by which the initial energy is exerted on the friction device. Fig. 7 is a longitudinal section, and Fig. 8 a transverse section, of the said axle and friction device provided with a modified form of the said contrivance by which the initial energy is exerted on the friction device. Figs. 9 and 10 are respectively a plan and a side elevation of one of the sections of which the said friction device may be composed when made in the form of a resilient spiral band. Figs. 11 and 12 are respectively a plan and a cross-section of one the said sections with the resilient wires or members connected therewith. Fig. 13 is a longitudinal section, and Fig. 14 a sectional end elevation, of a modified form of the frictional device.

In all the figures like letters of reference indicate similar parts.

In the ensuing description I shall describe my invention as applied to an electrically-propelled tram-car working on the aforesaid regenerative system, it being understood that my invention is applicable to other vehicles propelled by other means.

A is the casing inclosing one of the electric motors for propelling the car.

B B' are two of the car-wheel axles, and B$^2$ B$^2$ wheels thereon.

C is the brake-lever, connected by a rod C' to the levers C$^2$ C$^2$, carrying the brake-shoes.

D is the friction device in the form of a resilient spiral band mounted on the axle B', and E′ E² are the ropes by which the ends of the band are connected with the brake-lever C.

Referring more particularly to Figs. 1 to 6, the said resilient spiral band D is loosely mounted on the axle B′ and connected at its ends with disks $d\ d^\times$, Figs. 3 and 4, which are grooved for the reception of the wire ropes E′ E², said disks being loosely mounted on the axle, like the spiral band. D′ is a casing surrounding the spiral band and the disks for the purpose of limiting the extent to which the band can expand by its resiliency when freed. The said casing has end plates $d^2\ d^2$ loosely mounted on the axle and is connected by a bracket or arm $d^3$ to the underframe of the car or to some other convenient stationary part thereof. The wire ropes E′ E² are led to and pass around a double sheave or pulley $e$, forming part of the contrivance by which the initial energy is exerted on the spiral band through said ropes. This double sheave may be formed with grooves $e'\ e^2$, Figs. 5 and 6, for the reception of the ropes, which are arranged to pass around said sheave or pulley in opposite directions—that is to say, the rope E′ passes around it from left to right and the rope E² passes around it from right to left, each of said ropes being connected to the sheave at the points $e^3\ e^4$. The sheave has trunnions $e^5$, mounted in bearings in an inclosing box or casing $e^6$, having a removable cover or end plate $e^7$. The said box or casing has at its upper part two guide-pulleys $e^8\ e^8$, that are supported by a fixed rail $e^9$, projecting horizontally from a support $e^{10}$, said guide-pulleys permitting the box or casing and the sheave it contains to slide on the said rail $e^9$. Connected with an eye $e^{11}$ on the said casing is a cord $e^{12}$, to the free end of which is attached a weight $e^{13}$. This weight is normally kept in a potentially-energized condition by a solenoid $e^{14}$. This solenoid has two windings, one of which is in shunt with the motors and subject to the full voltage of the mains and the other in series with the armatures and forms part of the starting resistance. The series winding is therefore only momentarily active when the motors are being started; but during this momentary activity the core of the solenoid and the weight it carries are lifted, the electric energy required for this purpose being a portion of that which would otherwise be absorbed by the starting resistance. As soon as the starting resistance is cut out of the circuit by the continued movement of the controller-handle, the shunt-winding of the solenoid alone being active and the energy required for retaining the core and weight in their raised position being comparatively small, only a correspondingly small current is required for energizing the said shunt-winding.

The free ends of the aforesaid ropes E′ E² are connected with the end of the ordinary brake-lever C, which by means of the rod C′ is coupled with the levers C² C² of the usual brake apparatus by which the brake-shoes C³ are applied to the peripheries of the wheels. It will therefore be seen that if the electric current by which the shunt-winding of the solenoid is excited be interrupted by reason of the motorman breaking said circuit by turning the controller-handle to the "off" position or operating an emergency-switch or otherwise the aforesaid weight will immediately become active on account of the fact that it will no longer be supported by the energy of the solenoid. Said weight will then fall and exert a pull on the sliding pulley $e$ and its casing $e^6$, which will accordingly move along the rail $e^9$ in the direction of the arrow in Fig. 1, thus exerting a pull on the portions of the said ropes that lead from the pulley to the ends of the spiral band. The effect of this pull is to bring the spiral band into frictional contact with the said axle, whereby (assuming the axle to be revolving in the direction of the arrow in Fig. 1) the band will be wound upon the axle from the end $d$. The portion of the ropes E′ E² between the pulley $e$ and the spiral band being taut, the said band cannot be wound onto the shaft without imparting angular movement to the pulley $e$, which in turning in the direction of the arrow in Fig. 2 takes up as much slack on the one side as it gives out on the other. A powerful pull will then be exerted on the rope E′ by the spiral band in deriving energy from the revolving axle B′, which pull will actuate the brake-lever C and cause the brake-shoes to be applied to the car-wheels with a corresponding force, thereby braking the car. It will be understood that as more and more of the convolutions of the spiral band become wound upon or frictionally grip the axle B′ the tension on the rope E² will tend to diminish, owing to the elongation of the spiral band due to its being wound up at one end; but this tendency is counteracted by the aforesaid angular movement of the sheave $e$, so that there will always continue to exist on the rope E² the same degree of tension which was applied and which is known to be sufficient to insure the proper grip of the band on the axle B′. The portion of the rope E² which lies between the sheave or pulley and the brake-lever C will meantime become slack by reason of the aforesaid angular displacement of the sheave $e$ and the movement of the brake-lever C in actuating the brake-shoes.

If the axle B′ be revolving in the opposite direction to that above stated, the winding of the convolutions of the spiral band on the axle will commence at the opposite end—viz., at $d^\times$—with the result that the pull due to the frictional grip of the band on the axle will be exerted through the other rope E², and the sheave $e$ will turn angularly in the opposite direction. The rope E² will therefore in this case operate the brake-lever, and the portion of the rope E' between the sheave $e$ and the said brake-lever will become loose. It will therefore be seen that by means of the said sliding sheave or pulley the spiral band can be caused to actuate the brake in whichever direction the car may be traveling. In either case when the weight $e^{13}$ is again raised by exciting the solenoid $e^{14}$ the spiral band will by its resiliency free itself from the axle B' and in so doing will cause the sliding sheave or pulley to return to its original position.

It will be obvious that I may (where it is not desired to provide for the application of the brakes automatically) dispense with the weight $e^{13}$ and connect the said sliding sheave or pulley $e$ to the ordinary rotary hand-lever usually employed for actuating the brakes by hand.

I prefer to make the aforesaid spiral band of sectional or vertebral form—that is to say, of a number of individual blocks of phosphor-bronze or other appropriate material (see Figs. 9 to 12) connected together end to end by means of two steel wires or similar members $d^4$ $d^4$, passing in spiral convolutions about said blocks. To securely connect the said steel wires to the blocks, I make the latter with longitudinal ribs $d^5$ and transverse projections $d^6$ on their exterior surfaces. The longitudinal ribs $d^5$ are adapted to lie between the two wires $d^4$ and the transverse projections $d^6$ are circularly recessed to enable the wires to separate laterally, and thus to be firmly secured to the blocks under the action of tapered or conically-headed screws $d^7$ when the latter are screwed into the circular recesses, as represented at Figs. 11 and 12. The free ends of these wires are joined to the aforesaid end disks $d$ $d^\times$.

Referring now to Figs. 7 and 8, which illustrate a modification of the contrivance by which the initial energy is exerted on the spiral band, D is the spiral band, as before, and $d$ $d^\times$ are the end disks thereof. Each of these end disks is provided with a toothed wheel $d^8$, gearing with toothed pinions $d^9$ $d^{10}$. One of these pinions—viz., $d^9$—is connected with the revolving field-magnets $f'$ of an electric motor F and the other of said pinions—viz., $d^{10}$—is connected with the revolving armature $f^2$ of said motor. In this case instead of a single weight $e^{13}$, as before, I employ two weights $e^{15}$ $e^{16}$, which are suspended by cords $e^{17}$ $e^{18}$ from grooved pulleys $e^{19}$ $e^{20}$ at opposite ends of the spiral band D, said grooved pulleys respectively forming part of the toothed wheels $d^8$ and of the disks $d$ $d^\times$. These weights $e^{15}$ $e^{16}$ are normally held in a raised position by the motor. When, however, the circuit through the motor is for any reason broken, the said weights descend and in so doing cause the spiral band to come into contact with the axle B', whereby the brake-lever C is actuated by the rope E' or the rope E², in accordance with the direction of revolution of the axle B', as already described.

I have described and shown only two forms of the contrivance by which the aforesaid initial energy can be exerted on the friction device, either of which forms would be found suitable for practical purposes. Nevertheless I do not limit myself thereto, as any other form of contrivance may be used for the purpose in view.

I also wish it to be understood that although I have so far found it preferable to employ the spiral-band form of the friction device there are other forms which the friction device may take. For example, I may use a cone friction-clutch, as illustrated in Figs. 13 and 14, in which B' is the rotary axle driven by the vehicle, and G a conical clutch member keyed thereto, so as to constantly revolve with the axle. G' is a sliding conical clutch member which is loosely mounted on said axle so as normally not to revolve therewith. If, however, the member G' is brought into frictional contact with the member G by sliding said member G' along the axle B', these two members will revolve together. For effecting this sliding movement a lever $g$ is provided, its free end being connected with a weight $e^{13}$, which is potentially energized by a solenoid $e^{14}$. The other end of the lever $g$ is forked and connected with the sliding member G' by a ring $g'$. The said member G' is also formed with a neck for the reception of convolutions of rope spirally wound around it and secured thereto midway of its length. The opposite ends E' E² of the spirally-wound rope are led to the brake-lever C. When the sliding clutch member G' is brought into contact with the member G by the release of the weight $e^{13}$, it immediately revolves with the axle B' and becomes coöperative therewith, with the result that one or other end of the rope is pulled (in accordance with the direction of revolution of the axle B') and the brakes are thereby applied.

Where the apparatus is used with a vehicle which is intended to travel only in one direction, the said apparatus may be considerably simplified, as it will then only be necessary to provide for its operation when the rotary axle carrying the friction device revolves in one direction.

When my apparatus is intended to operate track-slippers, instead of brake-shoes applied to the peripheries of the car-wheels, as above described, the aforesaid brake-lever would be connected by suitable means to the said track-slippers.

I am aware that it has heretofore been proposed to combine with a car or similar moving vehicle a brake apparatus operatively connected with the axle of the car by a rope wound therearound and in such manner that the kinetic energy of the car will continue to apply the brakes after they have once been set for operation, no matter in which direction the car may be running nor from which end of the car the brakes may be applied, and I make no claim hereinafter broad enough to include such a structural device.

What I claim, and desire to secure by Letters Patent of the United States, is—

1. In vehicle brake apparatus, the combination with a rotary axle driven by the vehicle, of a friction device consisting of a resilient spiral band mounted on said axle, means for automatically rendering said friction device coöperative with the rotary axle, and means whereby the energy resulting from said coöperation and derived from the kinetic energy of the moving vehicle, will actuate brakes located upon another part of the vehicle.

2. In vehicle brake apparatus, the combination with a rotary axle driven by the vehicle, of a friction device mounted on said axle, a potentially-energized contrivance for rendering said friction device coöperative with the rotary axle, means for restraining the operation of said potentially-energized contrivance, and means whereby the energy resulting from the aforesaid coöperation and derived from the kinetic energy of the moving vehicle, will actuate the brakes.

3. In vehicle brake apparatus, the combination with a rotary axle driven by the vehicle, of a friction device mounted on said axle, a potentially-energized contrivance for rendering said friction device coöperative with the rotary axle, electrical means for restraining the operation of said potentially-energized contrivance, means whereby the variation or breakage of the current through the electrical means permits the potentially-energized contrivance to act automatically, and means whereby the energy resulting from the aforesaid coöperation and derived from the kinetic energy of the moving vehicle, will actuate the brakes.

4. In vehicle brake apparatus, the combination with a rotary axle driven by the vehicle, of a resilient spiral band loosely surrounding said axle, flexible connections leading from the ends of said spiral band to the brake-lever located upon another part of the vehicle, means for exerting a pull on said flexible connections to cause the spiral band to frictionally engage with the rotary axle, and means whereby the energy due to the coöperation of the band with the axle is transmitted through one of said flexible connections to the said brake-lever, and the slack of the other flexible connection taken up so that the pull continues to be exerted on the other flexible connection, substantially as described.

5. In vehicle brake apparatus, the combination with a rotary axle driven by the vehicle, of a resilient spiral band loosely surrounding said axle, wire ropes leading from the ends of said spiral band to the brake-lever, a sliding pulley around which the ropes pass in opposite directions and to which they are connected at diametrically opposite points, and means for exerting a pull on said sliding pulley in a direction to cause the spiral band to coöperate with the rotary axle and one or other of the ropes to actuate the brake-lever, substantially as described.

6. In vehicle brake apparatus, the combination with a rotary axle driven by the vehicle, of a resilient spiral band loosely surrounding said axle, ropes leading from the ends of said spiral band to the brake-lever, a sliding pulley around which the ropes pass in opposite direction and to which they are connected at diametrically opposite points, a weight or spring capable of moving said sliding pulley in a direction to cause the spiral band to coöperate with the rotary axle, electrical means for normally restraining said weight or spring from acting, and means whereby in the event of the circuit of said electrical means being varied or interrupted, the weight or spring will automatically act to render the spiral band coöperative with the rotary axle and the brakes to be applied, substantially as described.

7. In vehicle brake apparatus, the combination with a rotary axle driven by the vehicle, of a sectional or vertebral spiral band loosely surrounding said axle, means for rendering said band coöperative with the rotary axle, and means whereby the energy resulting from said coöperation and derived from the kinetic energy of the moving vehicle will actuate the brakes, substantially as described.

8. In vehicle brake apparatus, the combination with a rotary axle driven by the vehicle, of a sectional or vertebral resilient spiral band loosely surrounding said axle, loose grooved disks connected to the ends of said band, a casing inclosing said band and limiting the extent of its lateral expansion due to its resiliency, ropes passing around and connected to said disks and leading to the brake-lever, means for exerting a pull on said ropes and disks to cause the latter to turn and render the spiral band coöperative with the rotary axle, and means whereby the energy due to such coöperation is transmitted to the brake-lever through one or other of the ropes, substantially as described.

9. In vehicle brake apparatus, the combination with a rotary axle driven by the vehicle, of a spiral band loosely surrounding said axle and made in sections, loose grooved disks connected to the ends of said band, resilient members extending around the periphery of the sectional band, means for connecting said members to each of the sections and to the loose grooved disks, a casing inclosing said band and limiting the extent of its lateral expansion due to its resiliency, means for rendering said sectional band coöperative with the rotary axle, and means whereby the energy resulting from said coöperation and derived from the kinetic energy of the moving vehicle will actuate the brakes, substantially as described.

10. In vehicle brake apparatus for use with electrically-propelled vehicles having motors capable of working as such for propelling and accelerating the vehicle and of working as electric generators for retarding the vehicle, the combination with a rotary axle driven by the vehicle, of a friction device mounted on said axle, a potentially-energized electrical contrivance in circuit with the electrical equipment of the vehicle, means for liberating said potentially-energized contrivance and enabling it to render the friction device coöperative with the rotary axle when the regenerative function of the motors working as generators, for any reason unduly diminishes or ceases, and means whereby the energy resulting from the aforesaid coöperation and derived from the kinetic energy of the moving vehicle will actuate the brakes.

In testimony whereof I have hereunto set my hand, in presence of two subscribing witnesses, this 18th day of November, 1903.

EDWARD HIBBERD JOHNSON.

Witnesses:
   T. SELBY WARDLE,
   WALTER J. SKERTEN.